United States Patent
Choi et al.

(10) Patent No.: US 11,669,694 B2
(45) Date of Patent: Jun. 6, 2023

(54) ELECTRONIC DEVICE FOR OBTAINING SENTENCE CORRESPONDING TO CONTEXT INFORMATION AND OPERATING METHOD THEREOF

(71) Applicants: SAMSUNG ELECTRONICS CO., LTD., Suwon-si (KR); NEW YORK UNIVERSITY, New York, NY (US)

(72) Inventors: Yoonjung Choi, Suwon-si (KR); Jaedeok Kim, Suwon-si (KR); Ilia Kulikov, New York, NY (US); Sean Welleck, New York, NY (US); Yuanzhe Pang, New York, NY (US); Kyunghyun Cho, New York, NY (US)

(73) Assignees: SAMSUNG ELECTRONICS CO., LTD., Suwon-si (KR); NEW YORK UNIVERSITY, New York, NY (US)

( * ) Notice: Subject to any disclaimer, the term of this patent is extended or adjusted under 35 U.S.C. 154(b) by 97 days.

(21) Appl. No.: 17/077,874

(22) Filed: Oct. 22, 2020

(65) Prior Publication Data

US 2021/0240942 A1  Aug. 5, 2021

Related U.S. Application Data

(60) Provisional application No. 62/967,848, filed on Jan. 30, 2020.

(30) Foreign Application Priority Data

Apr. 14, 2020 (KR) .................. 10-2020-0045258

(51) Int. Cl.
G06F 40/44 (2020.01)
G06F 40/56 (2020.01)
G06F 40/284 (2020.01)

(52) U.S. Cl.
CPC ............ *G06F 40/44* (2020.01); *G06F 40/284* (2020.01); *G06F 40/56* (2020.01)

(58) Field of Classification Search
None
See application file for complete search history.

(56) References Cited

U.S. PATENT DOCUMENTS 11,170,175 B1 *  11/2021  Kohli ................... G06F 40/284
2019/0272318 A1 *  9/2019  Suzuki ................. G06N 3/0445
(Continued)

FOREIGN PATENT DOCUMENTS

CN       107783960 A  *  3/2018  ........... G06F 16/288
KR   10-2019-0039817 A     4/2019

OTHER PUBLICATIONS

Zhaopeng Tu, Zhengdong Lu, Yang Liu, Xiaohua Liu, Hang Li. "Modeling Coverage for Neural Machine Translation" Proceedings of the 54th Annual Meeting of the Association for Computational Linguistics, pp. 76-85, Berlin, Germany, Aug. 7-12, 2016. c 2016 Association for Computational Linguistics (Year: 2016).*

(Continued)

*Primary Examiner* — Richemond Dorvil
*Assistant Examiner* — Alexander G Marlow
(74) *Attorney, Agent, or Firm* — Sughrue Mion, PLLC

(57) ABSTRACT

A method of obtaining, by an electronic device, a sentence corresponding to context information, including obtaining first output information including at least one word output by decoding the context information based on at least one data; based on detecting that a first token is not included in the first output information, determining whether a number of words included in the first output information is greater than or equal to a reference value; based on a result of the determining, replacing the at least one data with other data; and obtaining the sentence corresponding to the context (Continued)

information based on at least one output information obtained by decoding the context information based on the other data.

15 Claims, 5 Drawing Sheets

(56) References Cited

U.S. PATENT DOCUMENTS

2020/0034435 A1 1/2020 Norouzi et al.
2020/0285932 A1* 9/2020 Singh .................. G06N 7/005

OTHER PUBLICATIONS

Haitao Mi, Baskaran Sankaran, Zhiguo Wang, Abe Ittycheriah. "Coverage Embedding Models for Neural Machine Translation" arXiv:1605.03148 (Year: 2016).*
Ari Holtzman, Jan Buys, Maxwell Forbes, Yejin Choi. "The Curious Case of Neural Text Degeneration" arXiv:1904.09751 (Year: 2019).*

* cited by examiner

ELECTRONIC DEVICE FOR OBTAINING SENTENCE CORRESPONDING TO CONTEXT INFORMATION AND OPERATING METHOD THEREOF

CROSS-REFERENCE TO RELATED APPLICATIONS

This application claims priority to U.S. Provisional Application No. 62/967,848, filed on Jan. 30, 2020, in the U.S. Patent and Trademark Office, and Korean Patent Application No. 10-2020-0045258, filed on Apr. 14, 2020, in the Korean Intellectual Property Office, the disclosures of which are incorporated by reference herein in their entireties.

BACKGROUND

1. Field

The disclosure relates to an electronic device for obtaining a sentence corresponding to context information and an operating method thereof.

2. Description of Related Art

Context information may include information encoded by sequentially processing a plurality of pieces of information (e.g., features of a voice signal, features of an input sentence) corresponding to a sentence. As decoding is performed on the context information, the sentence corresponding to the context information may be obtained.

Decoding may be repeatedly performed in sequence on context information. For example, decoding may be repeatedly performed in sequence such that current decoding may be performed based on the word which has been output as a result of previous decoding. Furthermore, decoding may be repeatedly performed until a token representing the end of a sentence is output instead of a word as a result of the decoding.

However, when the token representing the end of a sentence is not output due to an error having occurred or one word repeatedly being output, a considerably long sentence may be generated. Therefore, methods are needed to prevent the generation of the considerably long sentence due to an absence of the token representing the end of a sentence.

SUMMARY

Provided is an electronic device for obtaining a sentence corresponding to context information and an operating method thereof.

Provided is a computer-readable recording medium having recorded thereon a program for executing the method on a computer. The technical problems of the disclosure are not limited to the technical features described above, and other unstated technical problems may exist.

Additional aspects will be set forth in part in the description which follows and, in part, will be apparent from the description, or may be learned by practice of the presented embodiments.

In accordance with an aspect of the disclosure, a method of obtaining, by an electronic device, a sentence corresponding to context information includes obtaining first output information including at least one word output by decoding the context information based on at least one data; based on detecting that a first token is not included in the first output information, determining whether a number of words included in the first output information is greater than or equal to a reference value; based on a result of the determining, replacing the at least one data with other data; and obtaining the sentence corresponding to the context information based on at least one output information obtained by decoding the context information based on the other data.

The at least one data may include at least one of a language model or a decoding algorithm.

The replacing the at least one data with the other data may increase a probability that output information including the first token is obtained.

The at least one data may include a first language model having a first probability value for the first token, and the other data may include a second language model having a second probability value for the first token, and the first probability value may be different from the second probability value.

The at least one data may include a first decoding algorithm, and the other data may include a second decoding algorithm having the first token added as a candidate word.

The first token may represent an end of the sentence, and based on output information including the first token being obtained, the electronic device may obtain the sentence corresponding to the context information.

Based on a number of words included in second output information being determined to be greater than or equal to a first reference value, first-first data of the at least one data may be replaced with second-first data, and based on a number of words included in third output information being determined to be greater than or equal to a second reference value that is greater than the first reference value, first-second data of the at least one data may be replaced with second-second data.

In accordance with an aspect of the disclosure, an electronic device for obtaining a sentence corresponding to context information includes a memory configured to store at least one data used for decoding the context information; at least one processor configured to: obtain first output information including at least one word output by decoding the context information based on the at least one data, based on detecting that a first token is not included in the first output information, determine whether a number of words included in the first output information is greater than or equal to a reference value, based on a result of the determining, replace the at least one data with other data, and obtain the sentence corresponding to the context information based on at least one output information obtained by decoding the context information based on the other data; and an output interface configured to output information corresponding to the obtained sentence.

The at least one data may include at least one of a language model or a decoding algorithm.

The replacing the at least one data with the other data may increase a probability that output information including the first token is obtained.

The at least one data may include a first language model having a first probability value for the first token, and the other data may include a second language model having a second probability value for the first token, and the first probability value may be different from the second probability value.

The at least one data may include a first decoding algorithm, and the other data may include a second decoding algorithm having the first token added as a candidate word.

The first token may represent an end of the sentence, and based on output information including the first token being obtained, the at least one processor may obtain the sentence corresponding to the context information.

Based on a number of words included in second output information being determined to be greater than or equal to a first reference value, first-first data of the at least one data is replaced with second-first data, and wherein based on a number of words included in third output information being determined to be greater than or equal to a second reference value that is greater than the first reference value, first-second data of the at least one data is replaced with second-second data.

In accordance with an aspect of the disclosure, a non-transitory computer-readable medium is configured to store instructions which, when executed by at least one processor of an electronic device for obtaining a sentence corresponding to context information, cause the at least one processor to: obtain first output information including at least one word output by decoding the context information based on at least one data; based on detecting that a first token is not included in the first output information, determine whether a number of words included in the first output information is greater than or equal to a reference value; based on a result of the determining, replace the at least one data with other data; and obtain the sentence corresponding to the context information based on at least one output information obtained by decoding the context information based on the other data.

The at least one data may include at least one of a language model or a decoding algorithm.

The replacing the at least one data with the other data may increase a probability that output information including the first token is obtained.

The at least one data may include a first language model having a first probability value for the first token, the other data may include a second language model having a second probability value for the first token, and the first probability value may be different from the second probability value.

The at least one data may include a first decoding algorithm, and the other data may include a second decoding algorithm having the first token added as a candidate word.

Based on a number of words included in second output information being determined to be greater than or equal to a first reference value, first-first data of the at least one data may be replaced with second-first data, and based on a number of words included in third output information being determined to be greater than or equal to a second reference value that is greater than the first reference value, first-second data of the at least one data may be replaced with second-second data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
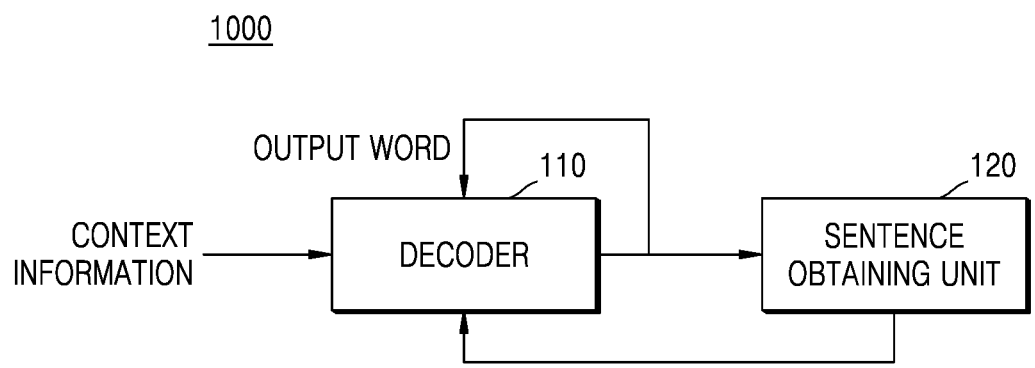
FIG. 1 is a diagram illustrating an example of an electronic device for obtaining a sentence corresponding to context information, according to an embodiment.

Hereinafter, embodiments of the disclosure will be described in detail with reference to the accompanying drawings to be easily implemented by those of ordinary skill in the art. However, the disclosure may be implemented in various forms and is not limited to the embodiments described herein. In the drawings, components irrelevant to the description are omitted for clearly explaining the disclosure, and similar reference numerals denote similar components throughout the specification.

Throughout the specification, the term "connected" may mean not only that a component is "directly connected" to the other component, but also that the component is "electrically connected" to the other component via an element therebetween. Furthermore, when a part is referred to as "comprising" or "including" a component, the part may further comprise or include the other components rather than excluding another component unless the context indicates otherwise.

Throughout the disclosure, the expression "at least one of a, b or c" indicates only a, only b, only c, both a and b, both a and c, both b and c, all of a, b, and c, or variations thereof.

Hereinafter, embodiments will be described in detail with reference to the accompanying drawings.

FIG. 1 is a diagram illustrating an example of an electronic device 1000 for obtaining a sentence corresponding to context information, according to an embodiment of the disclosure.

Referring to FIG. 1, the electronic device 1000 according to an embodiment of the disclosure may include a decoder 110 to receive context information and output at least one word generated based on the context information, and a sentence obtaining unit 120 to obtain a sentence corresponding to the context information based on the at least one word output from the decoder 110.

The electronic device 1000 according to an embodiment of the disclosure may be a device to obtain a sentence corresponding to context information and provide a user with the sentence.

The electronic device 1000 according to an embodiment of the disclosure may be implemented in various forms. For example, the electronic device 1000 of the disclosure may include a digital camera, a smartphone, a laptop computer, a tablet PC, an electronic book terminal, a digital broadcasting terminal, a personal digital assistant (PDA), a portable multimedia player (PMP), a navigation device, an MP3 player, a vehicle, etc., but is not limited thereto. The electronic device 1000 may be a wearable device that may be worn by a user. The wearable device may include at least one of an accessory type device (e.g., a watch, a ring, a wrist band, an ankle band, a necklace, glasses, a contact lens), a head-mounted device (HMD), a textile or clothing integrated device (e.g., electronic clothing), a body-attached device (e.g., a skin pad), or a bio-implantable device (e.g., an implantable circuit), but is not limited thereto.

The context information according to an embodiment of the disclosure may include compressed vector information corresponding to input information. The vector information according to an embodiment of the disclosure may include a set of numbers processable by the decoder 110. The input information according to an embodiment of the disclosure may refer to information obtained to generate context information, and the context information may be generated based on the input information.

In addition, the context information according to an embodiment of the disclosure may include vector information that may be obtained in a manner that a plurality of items of data of input information are sequentially processed. For example, the context information may be generated through a recurrent neural network, such as a recurrent neural network (RNN) and a long short term memory (LSTM), which may sequentially process the plurality of items of data of input information. The context information is not limited to the examples described above, and may be generated according to various methods.

The context information according to an embodiment of the disclosure may include vector information corresponding to an input sentence as a result of encoding the input sentence in a first language. For example, as each word included in the input sentence in the first language is sequentially processed by an RNN or an LSTM, context information corresponding to the input sentence in the first language may be obtained.

In addition, the context information according to an embodiment of the disclosure may include vector information corresponding to a voice signal as a result of processing the voice signal containing a user's voice. For example, as the feature information of a voice signal obtained for each time period may be sequentially processed by an RNN or an LSTM, context information corresponding to the voice signal may be obtained.

The context information according to an embodiment of the disclosure is not limited to the examples described above, and may include various types of information that may correspond to various types of input information and may be processed by the decoder 110.

According to an embodiment of the disclosure, as the context information is processed by the decoder 110, a sentence corresponding to the context information may be obtained.

For example, an output sentence in a second language may be obtained by the decoder 110 based on context information generated based on an input sentence in a first language. Accordingly, as the output sentence in the second language corresponding to the context information may be obtained by the decoder 110 according to an embodiment of the disclosure, a translation operation from the first language to the second language may be performed.

Furthermore, a sentence corresponding to a voice signal may be obtained by the decoder 110 based on context information generated based on the feature information of the voice signal. Accordingly, when the context information according to an embodiment of the disclosure is information generated as the feature information of a voice signal is encoded, a sentence corresponding to the voice signal may be obtained by the decoder 110, and thus a text-to-speak (TTS) operation of converting a voice signal into a text or an operation of automatically generating subtitles for a voice included in a video may be performed.

Without being limited to the examples described above, according to an embodiment of the disclosure, various operations may be performed as a sentence corresponding to context information may be obtained by the electronic device 1000.

The decoder 110 according to an embodiment of the disclosure may decode context information using a recurrent neural network, such as an RNN, and an LSTM, capable of sequentially processing data, as in the case where input information is processed to generate context information.

The decoder 110 according to an embodiment of the disclosure may sequentially process data using a recurrent neural network by setting a result which has been output by a current decoding on context information as an input for a subsequent decoding. For example, the decoder 110 may obtain a first word which has been output as context information is processed in a first operation, as an input for a second operation, and may obtain a second word in the second operation based on the context information and the first word.

The decoder 110 according to an embodiment of the disclosure may sequentially output a result of decoding on the context information in a word. However, the decoder 110 is not limited thereto, and may output results of decoding in various units. For example, the decoder 110 may output a result of decoding in various units such as a word, phrase, and morpheme.

The decoder 110 according to an embodiment of the disclosure may repeatedly perform an operation of processing pieces of information (e.g., an output from the previous operation) sequentially input, and may terminate decoding on context information based on an end token (e.g., <eos>) being obtained as an output word.

The end token according to an embodiment of the disclosure may be a token representing the end of a sentence, and as the decoder 110 outputs the end token instead of a word, decoding on the context information may be terminated. In addition, according to an embodiment of the disclosure, a sentence in which sequentially obtained words, from the first word until the end token is output, are sequentially arranged may be finally obtained as a sentence corresponding to context information.

The sentence obtaining unit 120 according to an embodiment of the disclosure may obtain a sentence corresponding to context information based on at least one word output from the decoder 110. The sentence obtaining unit 120 according to an embodiment of the disclosure may obtain at least one word sequentially until the decoder 110 outputs the end token, and may obtain a sentence corresponding to context information by arranging the obtained at least one word sequentially.

In addition, the sentence obtaining unit 120 according to an embodiment of the disclosure may control the decoder 110 to replace at least one data used by the decoder 110 with other data based on the number of words obtained until the decoder 110 outputs the end token. For example, when the decoder 110 replaces at least one data used by the decoder 110 with other data, the decoder 110 may replace at least one piece of data used by the decoder 110 with another piece of data or other pieces of data. According to an embodiment of the disclosure, at least one data used for performing decoding by the decoder 110 may be replaced to prevent the generation of an infinitely long sentence due to an absence of an end token output even though a considerably large number of words are output from the decoder 110. According to an embodiment of the disclosure, when the number of words which have been output from the decoder 110 at the moment, for example at a reference time after the beginning of the output of the words, is greater than or equal to a reference value, for example a reference number of words, at least one data used by the decoder 110 may be replaced.

The at least one data that may be replaced according to an embodiment of the disclosure may include at least one of a language model or a decoding algorithm.

The language model according to an embodiment of the disclosure may be a trained model for assigning probability values for a sequence of words, and the language model may assign, when given previous words, the probability value for each word appearing next. In addition, the language model according to an embodiment of the disclosure may consider the probability value for an end token, and thus, as the probability value for the end token may also be assigned, the end token may be output as the result of decoding according to the probability value. According to an embodiment of the disclosure, a current language model may be replaced with a new language model having the probability value for the end token determined to be greater than the probability value for the end token included in the current language model.

For example, the current language model may be replaced with a new language model in which the probability value $p\theta$ for the end token <eos> may be determined at every decoding, as shown in the following Equation 1.

$$p_\theta(\langle eos \rangle \mid y_{<t}, C) = 1 - \alpha(h_t)$$ [Equation 1]

$$p_\theta(v \mid y_{<t}, C) = \frac{\alpha(h_t)\exp(u_v^\top h_t + c_v)}{\sum_{v' \in V'} \exp(u_{v'}^\top h_t + c_{v'})}, \text{ if } v \in V',$$

where $$\alpha(h_0) = \sigma(u_{\langle eos \rangle}^\top h_0 + c_{\langle eos \rangle})$$

$$\alpha(h_t) = \sigma(u_{\langle eos \rangle}^\top h_t + c_{\langle eos \rangle})[1 - p_\theta(\langle eos \rangle \mid y_{<t-1}, C)]$$

$\sigma: \mathbb{R} \to [0, 1-\epsilon]$ with $\epsilon \in (0, 1)$, wherein $h_t$ is the current language model.

Without being limited to the example described above, the probability value for an end token included in a new language model may be determined according to various methods.

As decoding is repeatedly performed, the probability value for an end token may be determined to be a greater value by a new language model which may replace a current language model according to an embodiment of the disclosure. Accordingly, by the new language model, as the decoding is performed a greater number of times, the possibility that the end token is to be output may increase, and thus an infinitely long sentence may not be generated.

The decoding algorithm according to an embodiment of the disclosure may be an algorithm for selecting, from one or more candidate words, a word to be finally output based on the probability value for each word assigned by a language model. According to an embodiment of the disclosure, a word selected from one or more candidate words may be output as the result of decoding by a decoding algorithm according to various methods such as TOP-K sampling, nucleus sampling, etc.

According to an embodiment of the disclosure, a current decoding algorithm may be replaced with a new decoding algorithm that may forcibly add an end token to a group of candidate words to be finally output.

For example, decoding algorithms according to TOP-K sampling and nucleus sampling methods may be replaced with a new decoding algorithm that may forcibly add an end token, as shown in the following Equations 2 and 3, respectively.

$$q(v) \propto \begin{cases} p_\theta(v \mid y_{<t}, C), & \text{if } v \in V' \\ 0, & \text{otherwise,} \end{cases}$$ [Equation 2]

where $V' = \{\langle eos \rangle\} \cup \arg\underset{v'}{\text{top-}k} p_\theta(v' \mid y_{<t}, C)$.

$$q(v) \propto \begin{cases} p_\theta(v \mid y_{<t}, C), & \text{if } v \in V_\mu \cup \{\langle eos \rangle\} \\ 0, & \text{otherwise,} \end{cases}$$ [Equation 3]

Without being limited to the example described above, an end token may be added as a candidate word by a new decoding algorithm according to various methods.

Therefore, as an end token may be forcibly added as a candidate word by a new decoding algorithm according to an embodiment of the disclosure, the possibility that the end token is to be output may increase as decoding is performed, and thus an infinitely long sentence may not be generated.

According to an embodiment of the disclosure, context information may be processed and the result may be output on the electronic device 1000 without transmission and reception of data with a cloud server according to on-device artificial intelligence (AI) technology. For example, the electronic device 1000 may perform decoding on context information according to an embodiment of the disclosure, based on at least one of a language model or a decoding algorithm prestored in the electronic device 1000, without using data, for example a language model or a decoding algorithm, stored in a cloud server.

According to the on-device AI technology, the electronic device 1000 may learn by itself based on data collected by itself, and make decisions by itself based on a trained AI model, for example a language model or a decoding algorithm. According to the on-device AI technology, as the electronic device 1000 manages the collected data by itself without transmitting the collected data to the outside, user privacy protection and data processing rate may be improved.

For example, the electronic device 1000 may operate using the on-device AI technology without a connection with a cloud server, depending on whether the network environments of the electronic device 1000 are unstable, or the electronic device 1000 has sufficient information collected therein to be solely used to perform the operations according to an embodiment of the disclosure by an AI model trained by the electronic device 1000, without using big data.

However, the electronic device 1000 is not limited to operating according to the on-device AI technology, and may perform operations according to an embodiment of the disclosure through transmission and reception of data with a cloud server or an external device. In addition, the electronic device 1000 may perform operations according to an embodiment of the disclosure by combining the on-device AI technology described above with a method using transmission and reception of data with a cloud server.

Figure 2:
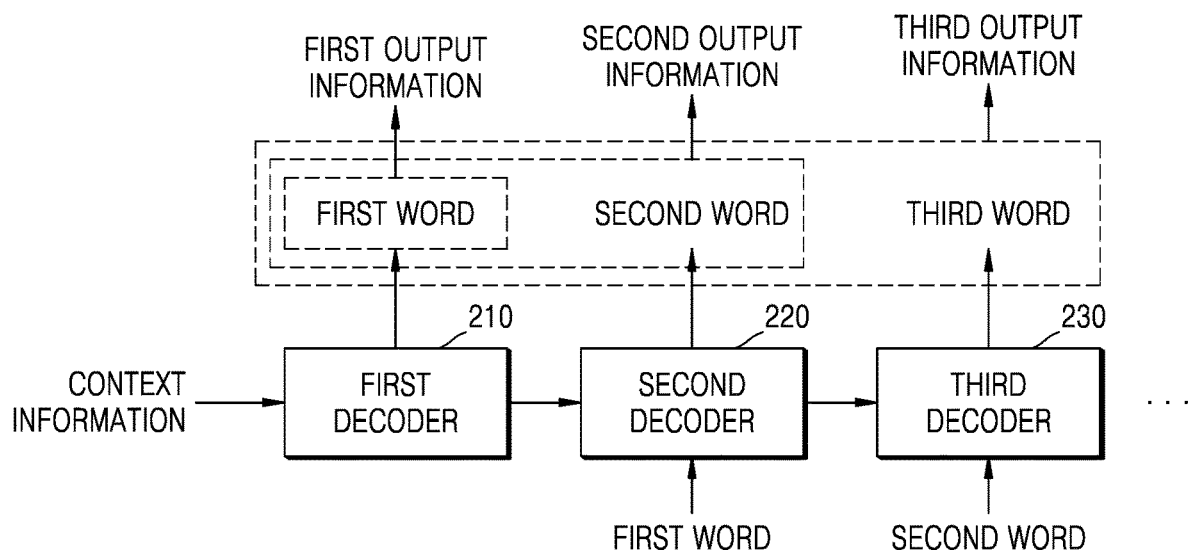
FIG. 2 is a diagram illustrating an example of outputting at least one word by a decoder, according to an embodiment.

When a method using a cloud server is more advantageous than a method using the on-device AI technology according to network environments and computing capabilities of the electronic device 1000, for example, under circumstances where operations through a cloud server are more advantageous in terms of a data processing rate or data not including user's personal information is transmitted to a cloud server, the operations according to an embodiment of the disclosure may be performed according to the method using a cloud server, FIG. 2 is a diagram illustrating an example of outputting at least one word by a decoder according to an embodiment of the disclosure.

Referring to FIG. 2, a first decoder 210, a second decoder 220, and a third decoder 230 may correspond to the decoder 110 of FIG. 1 operating at different time points, respectively. For example, the first decoder 210 may correspond to the operation of the decoder 110 in a first operation for outputting a first word, and the second decoder 220 may correspond to the operation of the decoder 110 in a second operation for outputting a second word.

According to an embodiment of the disclosure, each of the decoders 210, 220, and 230 may receive a word output from the decoder in a previous operation as an input and output a word until one of the decoders 210, 220, or 230 outputs an end token. For example, the second decoder 220 may receive a first word, which is the output from the first decoder 210, as an input, and output a second word. In addition, the third decoder 230 may receive the second word, which is the output from the second decoder 220, as an input, and output a third word.

According to an embodiment of the disclosure, as a first word is output from the first decoder 210, first output information including the first word may be obtained. In addition, as a second word is output from the second decoder 220, second output information including the first word and the second word may be obtained. Furthermore, as a third word is output from the third decoder 230, third output information including the first word, the second word, and the third word may be obtained.

Likewise, as an nth word is output from an nth decoder, nth output information including a first word to nth word may be obtained.

The electronic device 1000 according to an embodiment of the disclosure may replace, when it has been determined that an end token is not included in first output information, at least one data used for performing decoding in the second decoder 220 depending on whether the number of words included in the first output information is greater than or equal to a reference value, for example a reference number of words.

For example, when the reference value for the number of words is 10 and the number of words included in the first output information is 1 which does not exceed the reference value, decoding may be performed in the second decoder 220 without replacing at least one data used for performing decoding in the second decoder 220.

According to an embodiment of the disclosure, when the number of words included in nth output information is n, and n is greater than the reference value for the number of words which is 10, at least one data used for performing decoding in an (n+1)th decoder may be replaced with new data, and then decoding may be performed in the (n+1)th decoder. According to an embodiment of the disclosure, as decoding is performed according to newly replaced data, the probability that an end token is output as the result of decoding in the (n+1)th decoder may increase.

Figure 3:
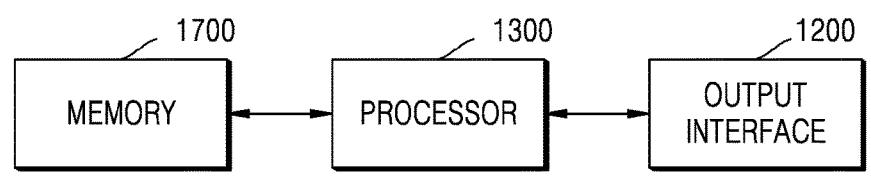
FIG. 3 is a block diagram illustrating an internal configuration of an electronic device according to an embodiment.

FIG. 3 is a block diagram illustrating the internal configuration of the electronic device 1000 according to an embodiment of the disclosure.

Figure 4:
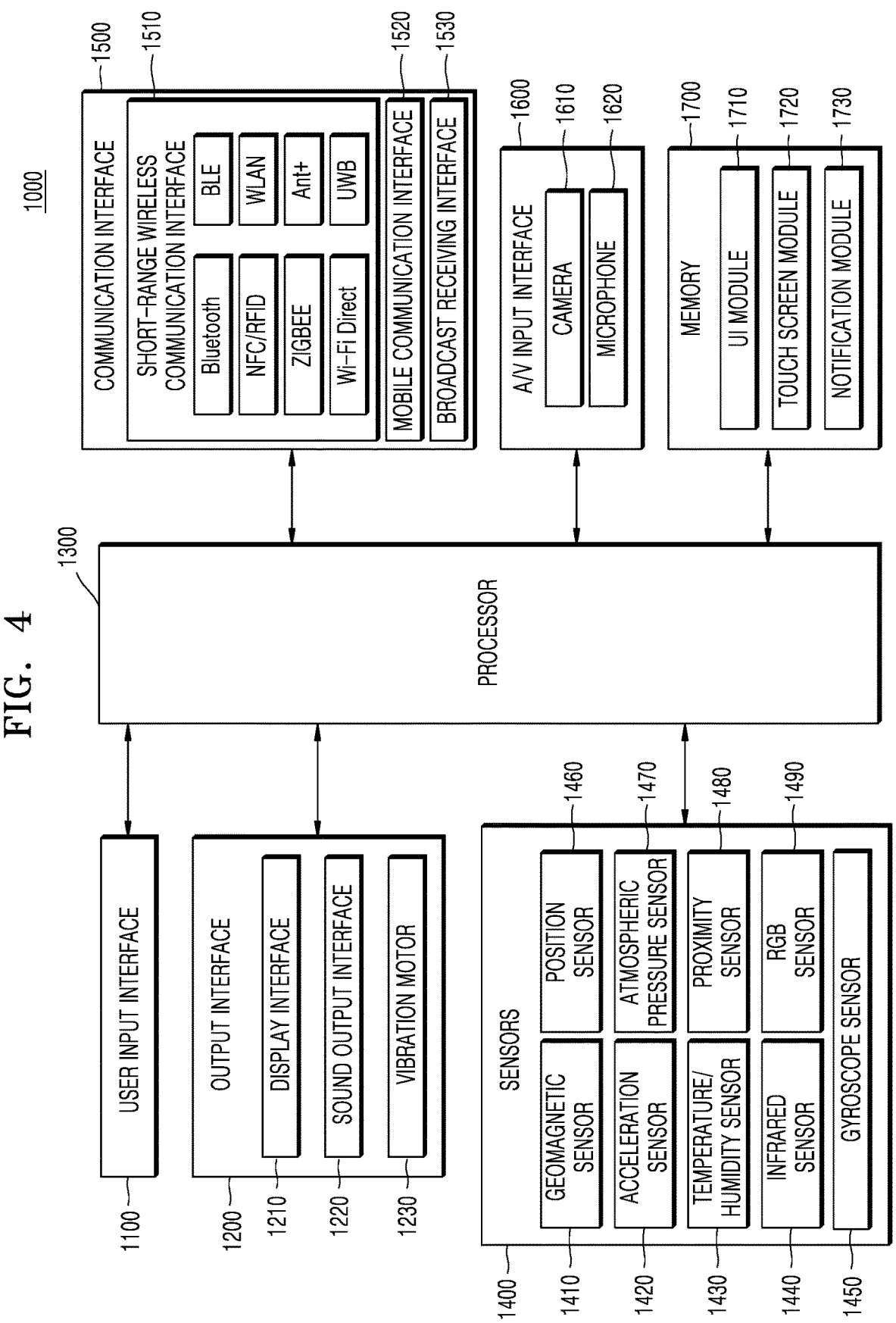
FIG. 4 is a block diagram illustrating an internal configuration of an electronic device according to an embodiment.

FIG. 4 is a block diagram illustrating the internal configuration of the electronic device 1000 according to an embodiment of the disclosure.

Referring to FIG. 3, the electronic device 1000 may include a processor 1300, a memory 1700, and an output interface 1200. However, all the components illustrated in FIG. 3 are not essential components of the electronic device 1000. The electronic device 1000 may be implemented by more components than those illustrated in FIG. 3, or may be implemented by fewer components than those illustrated in FIG. 3.

For example, as illustrated in FIG. 4, the electronic device 1000 according to some embodiments of the disclosure may further include a user input interface 1100, sensors 1400, a communication interface 1500, and an audio/video (A/V) input interface 1600 in addition to the processor 1300, the memory 1700, and the output interface 1200.

The user input interface 1100 refers to an interface to input, by a user, data to control the electronic device 1000. For example, the user input interface 1100 may include a key pad, a dome switch, a touch pad (for example a capacitive overlay type, a resistive overlay type, an infrared beam type, a surface acoustic wave type, an integral strain gauge type, and a piezoelectric type), a jog wheel, and a jog switch, but is not limited thereto.

According to an embodiment of the disclosure, the user input interface 1100 may receive a user input for obtaining a sentence corresponding to context information by decoding the context information. For example, the user input interface 1100 may receive a user input to input a sentence corresponding to context information.

The output interface 1200 may output an audio signal, a video signal, or a vibration signal, and may include a display 1210, a sound output interface 1220, and a vibration motor 1230.

The display 1210 may display information processed in the electronic device 1000. According to an embodiment of the disclosure, as a sentence corresponding to context information is obtained, the display 1210 may display information corresponding to the sentence.

Meanwhile, when the display 1210 and a touch pad form a layer structure to configure a touch screen, the display 1210 may be used as an input device as well as an output device. The display 1210 may include at least one of a liquid crystal display, a thin film transistor-liquid crystal display, an organic light-emitting diode, a flexible display, a 3D display, or an electrophoretic display. In addition, according to the implementation of the electronic device 1000, the electronic device 1000 may include two or more displays 1210.

The sound output interface 1220 may output audio data received from the communication interface 1500 or stored in the memory 1700.

The vibration motor 1230 may output a vibration signal. In addition, the vibration motor 1230 may output a vibration signal when a touch is input to the touch screen.

According to an embodiment of the disclosure, as a sentence corresponding to context information is obtained, the sound output interface 1220 and the vibration motor 1230 may output information corresponding to the sentence.

The processor 1300 may generally control the overall operation of the electronic device 1000. For example, the processor 1300 may generally control the user input interface 1100, the output interface 1200, the sensors 1400, the communication interface 1500, and the A/V input interface 1600 by executing programs stored in the memory 1700.

The electronic device 1000 may include at least one processor 1300. For example, the electronic device 1000 may include various types of processors such as a central processing unit (CPU), a graphics processing unit (CPU), a neural processing unit (NPU), etc.

The processor 1300 may be configured to process commands of a computer program by performing basic arithmetic, logic, and input/output operations. The commands may be provided from the memory 1700 to the processor 1300, or may be received through the communication interface 1500 and provided to the processor 1300. For example, the processor 1300 may be configured to execute the commands according to a program code stored in a recording device such as a memory.

The processor 1300 according to an embodiment of the disclosure may obtain first output information including at least one word by performing decoding on context information, and may determine whether a first token is included in the first output information. At least one word according to an embodiment of the disclosure may be sequentially obtained, every time decoding is performed, based on a word output in the previous operation. In addition, a first token may be an end token representing the end of a sentence, and as the first token is output as the result of decoding, a sentence corresponding to context information may be finally obtained.

According to an embodiment of the disclosure, when a first token is not included in first output information and the number of words included in the first output information is greater than or equal to a reference value, at least one data used for performing decoding may be replaced with other data in the subsequent decoding. According to an embodiment of the disclosure, the at least one data may be replaced with other data by which the probability that output information including the first token is obtained in the subsequent decoding may increase.

The processor 1300 according to an embodiment of the disclosure may obtain a sentence corresponding to context information based on at least one output information obtained by performing decoding on the context information based on the newly replaced other data. According to an embodiment of the disclosure, as at least one data is replaced with other data by which the probability that output information including the first token is obtained may increase, the probability that the obtained output information includes the first token may increase every time decoding is repeatedly performed. Therefore, according to an embodiment of the disclosure, when the number of words output is greater than or equal to a reference value without the end of a sentence, the data used for performing decoding is replaced such that an end token is output as soon as possible, and thus an infinitely long sentence may be prevented from being generated.

The sensors 1400 may sense the state of the electronic device 1000 or the state around the electronic device 1000 and may transmit the sensed information to the processor 1300.

The sensors 1400 may include at least one of a geomagnetic sensor 1410, an acceleration sensor 1420, a temperature/humidity sensor 1430, an infrared sensor 1440, a gyroscope sensor 1450, a position sensor (e.g., a GPS) 1460, an atmospheric pressure sensor 1470, a proximity sensor 1480, or an RGB sensor (illuminance sensor) 1490, but is not limited thereto.

The communication interface 1500 may include one or more components to allow the electronic device 1000 to communicate with a server 2000 or an external device (not shown). For example, the communication interface 1500 may include a short-range wireless communication interface 1510, a mobile communication interface 1520, and a broadcast receiving interface 1530.

The short-range wireless communication interface 1510 may include, but is not limited to, a Bluetooth communication interface, a Bluetooth low energy (BLE) communication interface, a near field communication interface, a WLAN (Wi-Fi) communication interface, a Zigbee communication interface, an infrared data association (IrDA) communication interface, a Wi-Fi direct (WFD) communication interface, an ultra wideband (UWB) communication interface, an Ant+ communication interface, etc.

The mobile communication interface 1520 may transmit and receive a radio signal to and from at least one of a base station, an external terminal, or a server over a mobile communication network. Here, the radio signal may include various types of data according to transmission and reception of a voice call signal, a video call signal, or a text/multimedia message.

The broadcast receiving interface 1530 may receive a broadcast signal and/or broadcast-related information from the outside via a broadcast channel. The broadcast channel may include a satellite channel and a terrestrial channel. According to embodiments of the disclosure, the electronic device 1000 may not include the broadcast receiving interface 1530.

According to an embodiment of the disclosure, the communication interface 1500 may receive, from the outside, data required to obtain a sentence corresponding to context information. For example, the communication interface 1500 may receive, from the outside, data required to replace at least one data used for performing decoding with other data by which the possibility that an end token is to be obtained may increase.

The A/V input interface 1600 is configured to input an audio signal or a video signal, and may include a camera 1610, a microphone 1620, etc. The camera 1610 may obtain an image frame such as a still image or a video through an image sensor in a video call mode or an image capturing mode. An image captured by the image sensor may be processed by the processor 1300 or a separate image processing unit.

The microphone 1620 may receive an external sound signal and process the sound signal into electrical voice data.

The memory 1700 may store a program for the processing and control of the processor 1300, and may store data input to or output from the electronic device 1000.

The memory 1700 according to an embodiment of the disclosure may store information required to obtain a sentence corresponding to context information. For example, the memory 1700 may store at least one data such as a language model, a decoding algorithm, etc., which may be used to obtain a sentence corresponding to context information by performing decoding on context information. In addition, the memory 1700 may store at least one of a new language model or a new decoding algorithm to replace at least one data used for performing decoding such that the possibility that the first token is to be output as the result of decoding may increase.

The memory 1700 may include a storage medium of at least one type of a memory (e.g., an SD or xD memory) of a flash memory, hard disk, multimedia card micro, or card type, a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

Programs stored in the memory 1700 may be classified into a plurality of modules according to functions thereof, for example, into a UI module 1710, a touch screen module 1720, a notification module 1730, etc.

The UI module 1710 may provide a specialized UI, GUI, etc. which may interwork with the electronic device 1000 for each application. The touch screen module 1720 may detect a touch gesture of a user on a touch screen, and may transmit information on the touch gesture to the processor 1300. The touch screen module 1720 according to some embodiments of the disclosure may recognize and analyze a touch code. The touch screen module 1720 may be configured as separate hardware including a controller.

To detect a touch or a proximity touch on the touch screen, various sensors may be provided inside or near the touch screen. An example of sensors for detecting a touch on the touch screen is a tactile sensor. The tactile sensor refers to a sensor that senses a contact of a specific object to the extent or more that a person may feel the contact. The tactile sensor may sense various pieces of information such as the roughness of a contact surface, the rigidity of a contact object, and the temperature of a contact point.

Touch gestures of a user may include a tap, a touch & hold, a double tap, a drag, panning, a flick, a drag-and-drop, a swipe, etc.

The notification module 1730 may generate a signal for notifying the occurrence of an event of the electronic device 1000.

Figure 5:
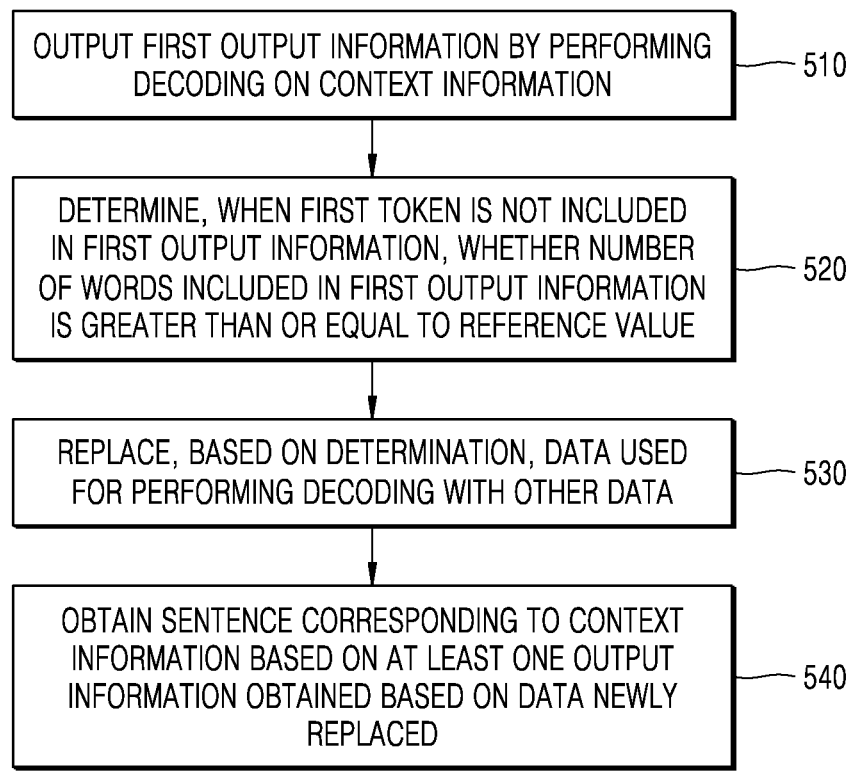
FIG. 5 is a flowchart illustrating a method of obtaining a sentence corresponding to context information, according to an embodiment.

FIG. 5 is a flowchart illustrating a method of obtaining a sentence corresponding to context information according to an embodiment of the disclosure.

Referring to FIG. 5, in operation 510, the electronic device 1000 may obtain first output information including at least one word by performing decoding on context information. The electronic device 1000 according to an embodiment of the disclosure may sequentially obtain at least one word by performing decoding on the context information.

In operation 520, when a first token is not included in first output information, the electronic device 1000 may determine whether the number of words included in the first output information is greater than or equal to a reference value.

The first token according to an embodiment of the disclosure may be an end token representing the end of a sentence. According to an embodiment of the disclosure, when an end token is output as decoding is sequentially performed, a final sentence in which at least one word which has been output is sequentially arranged may be obtained as a result of the decoding. Therefore, because decoding may be continuously performed until an end token is output, there may be a problem in that an infinitely long sentence, or otherwise overly long sentence may be obtained when the end token is not output due to an error occurred in the decoding or various causes.

However, according to an embodiment of the disclosure, in operation 530, when it is determined that the number of words included in the first output information is greater than or equal to the reference value, the electronic device 1000 may replace the at least one data used for performing decoding with other data, wherein based on the other data, the possibility that the first token is to be output in the subsequent decoding may increase.

The at least one data used for performing decoding according to an embodiment of the disclosure may be replaced with the other data. After the at least one data is replaced by the other data, the probability that output information including the first token is obtained in the subsequent decoding may increase.

Therefore, according to an embodiment of the disclosure, as the at least one data used for performing decoding is replaced, the generation of an infinitely long or overly long sentence due to an absence of the end token may be prevented.

In operation 540, the electronic device 1000 may obtain a sentence corresponding to the context information based on at least one output information obtained by sequentially performing decoding on the context information based on the other data in operation 530.

The electronic device 1000 according to an embodiment of the disclosure may perform the subsequent decoding by using the other data by which the probability that output information including the first token is obtained may increase and thus, as the decoding is repeatedly performed, the possibility of obtaining output information including the first token may increase. Accordingly, as the output information including the first token is obtained, the electronic device 1000 may finally obtain the sentence corresponding to the context information.

Figure 6:
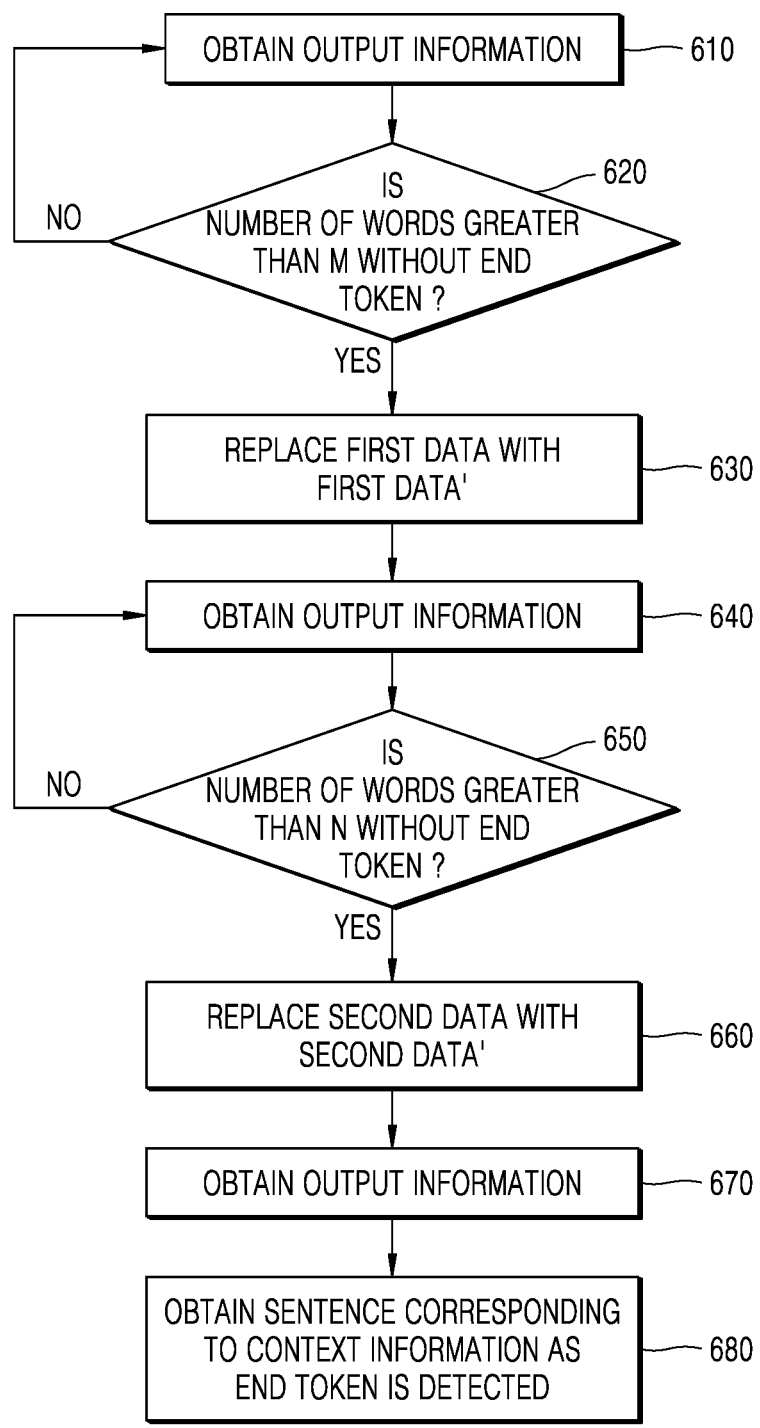
FIG. 6 is a flowchart illustrating a method of replacing at least one data used for performing decoding on context information with other data, according to an embodiment.

FIG. 6 is a flowchart illustrating a method of replacing at least one data used for performing decoding on context information with other data according to an embodiment of the disclosure.

Referring to FIG. 6, in operation 610, the electronic device 1000 may obtain current output information including at least one word as a result of sequentially performing decoding on the context information.

In operation 620, the electronic device 1000 may determine whether the output information obtained in operation 610 has a number of words greater than or equal to M without including an end token.

In operation 620, when the number of words of the current output information, which does not include the end token, exceeds M, in operation 630, the electronic device 1000 may replace first data of the at least one data used for performing decoding with first data'. In this regard, M may be a constant value greater than 1. Compared to the first data, the first data' according to an embodiment of the disclosure may include data by which the possibility that the end token is to be output may increase.

On the other hand, in operation 630, when the number of words of the current output information is less than M, the electronic device 1000 may sequentially perform decoding on the context information until output information having the number of words greater than or equal to M is obtained.

In operation 640, the electronic device 1000 may obtain output information including at least one word by performing decoding based on at least one data including the first data' newly replaced in operation 630.

In operation 650, when the number of words of the current output information which does not include the end token is greater than or equal to N, in operation 660, the electronic device 1000 may replace second data of at least one data used for performing decoding with second data'. The second data is used for performing decoding, and may be different from the first data. In this regard, N may be a constant value greater than or equal to M. Compared to the second data, the second data' according to an embodiment of the disclosure may include data by which the possibility that an end token is to be output may increase.

On the other hand, in operation 650, when the number of words of the current output information is less than N, the electronic device 1000 may sequentially perform decoding on the context information until output information having the number of words greater than or equal to N is obtained.

In operation 670, the electronic device 1000 may obtain output information including at least one word by performing decoding based on at least one data including the first data' newly replaced in operation 630 and the second data' newly replaced in operation 660. According to an embodiment of the disclosure, as the number of words included in the current output information gradually increases, decoding may be performed after replacing not only the first data but also the second data such that the probability that an end token is to be output may increase.

For example, the first data may be a language model and the second data may be a decoding algorithm, but they are not limited thereto, and the first data and the second data may be various types of data that may be used for performing decoding on context information.

In operation 680, the electronic device 1000 may sequentially obtain output information in each operation as a result of the decoding with the increased probability that an end token is output, and may obtain a final sentence corresponding to the context information when an end token is detected from the obtained output information.

According to an embodiment of the disclosure, when a sentence corresponding to the context information is generated by the decoder, the generation of an infinitely long or overly long sentence due to an absence of the end token detected may be prevented.

A storage medium readable by a device may be provided in the form of a non-transitory storage medium. Here, the term "non-transitory storage medium" merely refers to a tangible device and excludes a signal (e.g., an electromagnetic wave), but the term does not distinguish between a case where data is semipermanently stored in the storage medium and a case where data is temporarily stored in the storage medium. For example, the "non-transitory storage medium" may include a buffer in which data is temporarily stored.

According to an embodiment of the disclosure, the methods according to various embodiments disclosed herein may be included in a computer program product and provided. The computer program product may be a product and may be traded between a seller and a purchaser. The computer program product may be distributed in the form of a storage medium (e.g., a compact disc read only memory (CD-ROM)) readable by a device, or may be distributed online (e.g., downloaded or uploaded) through an application store (e.g., Play Store™) or directly between two user devices (e.g., smart phones). In the case of online distribution, at least a part of a computer program product (e.g., a downloadable app) may be temporarily stored or temporarily generated in a storage medium readable by a device such as a memory of a manufacturer's server, an application store's server, or a relay server.

In addition, throughout the specification, the term "unit" may refer to a hardware component such as a processor or a circuit, and/or a software component executable by a hardware component such as a processor.

The description of the disclosure is for illustration only, and it should be understood by those of skill in the art that the disclosure can be easily modified into other detailed forms without changing the technical principle or essential features of the disclosure. Therefore, the embodiments of the disclosure described above should be regarded as illustrative rather than limiting in all aspects. For example, each component which has been described as a unitary part may be implemented as distributed parts, and likewise, each component which has been described as distributed parts may also be implemented as a combined part.

According to an embodiment of the disclosure, when a sentence corresponding to the context information is generated by the decoder, the generation of an infinitely long sentence, or otherwise overly long sentence, due to an absence of the end token detected may be prevented.

The scope of the disclosure is presented by the accompanying Claims rather than the foregoing description, and it should be understood that all changes or modifications derived from the definitions and scopes of the Claims and their equivalents fall within the scope of the disclosure.

What is claimed is:

1. A method of obtaining, by an electronic device, a sentence corresponding to context information based on at least one data and outputting the obtained sentence on a display, the method comprising:
   receiving a user input using a user input interface;
   obtaining the context information corresponding to the user input by encoding the user input;
   obtaining first output information including at least one word output by decoding the context information based on first-first data stored in a memory;
   determining whether an end token is included in the first output information;
   based on detecting that the end token is not included in the first output information, obtaining second output information including at least one word output by decoding the context information based on first-second data stored in the memory;
   based on a number of words included in the second output information being determined to be greater than or equal to a first reference value, the first-first data is replaced with second-first data;
   obtaining the sentence corresponding to the context information based on the first output information and the second output information; and
   outputting the obtained sentence using the display,
   wherein the end token represents an end of the sentence,
   wherein the replacing the first-first data with the second-first data increases a probability that the first output information including the end token is obtained, and
   wherein at least one of the decodinq of the context information based on the first-first data and the decodinq of the context information based on the second-first data is performed by a recurrent neural network.

2. The method of claim 1, wherein the at least one data includes at least one of a language model or a decoding algorithm.

3. The method of claim 1, wherein the first-first data includes a first language model having a first probability value for the end token,
   wherein the second-first data includes a second language model having a second probability value for the end token, and
   wherein the first probability value is different from the second probability value.

4. The method of claim 1, wherein the first-first data includes a first decoding algorithm, and
   wherein the second-first data includes a second decoding algorithm having the end token added as a candidate word.

5. The method of claim 1, further comprising:
   based on detecting that the end token is not included in the second output information, obtaining third output information including at least one word output by decoding the context information based on third data; and
   based on the number of words included in the third output information being determined to be greater than or equal to a second reference value, the first-second data is replaced with second-second data;

wherein the second reference value is greater than or equal to the first reference value, wherein the sentence corresponding to the context information is obtained based on the first output information, the second output information and the third output information.

6. An electronic device for obtaining a sentence corresponding to context information and outputting the obtained sentence on a display, the electronic device comprising:
a user input interface configured to receive a user input;
a memory configured to store at least one data used for decoding the context information;
at least one processor configured to:
obtain the context information corresponding to the user input by encoding the user input,
obtain first output information including at least one word output by decoding the context information based on first-first data stored in the memory,
determine whether an end token is included in the first output information,
based on detecting that the end token is not included in the first output information, obtain second output information including at least one word output by decoding the context information based on first-second data stored in the memory,
based on a number of words included in the second output information being determined to be greater than or equal to a first reference value, replace the first-first data with second-first data,
obtain the sentence corresponding to the context information based on the first output information and the second output information; and
the display configured to output the obtained sentence,
wherein the end token represents an end of the sentence,
wherein the replacing the first-first data with the second-first data increases a probability that the first output information including the end token is obtained, and
wherein at least one of the decoding of the context information based on the first-first data and the decoding of the context information based on the second-first data is performed by a recurrent neural network.

7. The electronic device of claim 6, wherein the at least one data includes at least one of a language model or a decoding algorithm.

8. The electronic device of claim/j wherein the first-first data includes a first language model having a first probability value for the end token,
wherein the second-first data includes a second language model having a second probability value for the end token, and
wherein the first probability value is different from the second probability value.

9. The electronic device of claim 6, wherein the first-first data includes a first decoding algorithm, and
wherein the second-first data includes a second decoding algorithm having the end token added as a candidate word.

10. The electronic device of claim 6, wherein the at least one processor is further configured to:
based on detecting that the end token is not included in the second output information, obtain third output information including at least one word output by decoding the context information based on third data, and
based on the number of words included in the third output information being determined to be greater than or equal to a second reference value, replace the first-second data with second-second data, wherein the second reference value is greater than or equal to the first reference value, wherein the sentence corresponding to the context information is obtained based on the first output information, the second output information and the third output information.

11. A non-transitory computer-readable medium configured to store instructions which, when executed by at least one processor of an electronic device for obtaining a sentence corresponding to context information based on at least one data and outputting the obtained sentence on a display, cause the at least one processor to:
receive a user input using a user input interface;
obtain the context information corresponding to the user input by encoding the user input;
obtain first output information including at least one word output by decoding the context information based on first-first data stored in a memory;
determine whether an end token is included in the first output information;
based on detecting that the end token is not included in the first output information, obtain second output information including at least one word output by decoding the context information based on first-second data stored in the memory;
based on a number of words included in the second output information being determined to be greater than or equal to a first reference value, replace the first-first data with second-first data;
obtain the sentence corresponding to the context information based on the first output information and the second output information; and
output the obtained sentence using the display
wherein the end token represents an end of the sentence, and
wherein the replacing the first-first data with the second-first data increases a probability that the first output information including the end token is obtained, and
wherein at least one of the decoding of the context information based on the first-first data and the decoding of the context information based on the second-first data is performed by a recurrent neural network.

12. The non-transitory computer-readable medium of claim 11, wherein the at least one data includes at least one of a language model or a decoding algorithm.

13. The non-transitory computer-readable medium of claim 11, wherein the first-first data includes a first language model having a first probability value for the end token,
wherein the second-first data includes a second language model having a second probability value for the end token, and
wherein the first probability value is different from the second probability value.

14. The non-transitory computer-readable medium of claim 11, wherein the first-first data includes a first decoding algorithm, and
wherein the second-first data includes a second decoding algorithm having the end token added as a candidate word.

15. The non-transitory computer-readable medium of claim 11,
wherein based on detecting that the end token is not included in the second output information, obtaining third output information including at least one word output by decoding the context information based on third data; and based on the number of words included in the third output information being determined to be greater than or equal to a second reference value, the first-second data is replaced with second-second data;

wherein the second reference value is greater than or equal to the first reference value, wherein the sentence corresponding to the context information is obtained based on the first output information, the second output information and the third output information.

* * * * *